US012747034B2

(12) United States Patent
Tran et al.

(10) Patent No.: US 12,747,034 B2
(45) Date of Patent: Sep. 29, 2026

(54) AUTOMATIC UMBILICAL CONNECTOR SEPARATING MECHANISM ALLOWING SEPARATING IN THE SAME DIRECTION AS THE MOTION OF A FLYING OBJECT

(71) Applicant: VIETTEL GROUP, Ha Noi City (VN)

(72) Inventors: Quang Duc Tran, Ha Noi City (VN); Tuan Dung Mai, Dong Hung District (VN); Minh Thanh Chu, Ha Noi City (VN); Van Phuong Do, Ha Noi City (VN)

(73) Assignee: VIETTEL GROUP, Ha Noi City (VN)

( * ) Notice: Subject to any disclaimer, the term of this patent is extended or adjusted under 35 U.S.C. 154(b) by 359 days.

(21) Appl. No.: 18/627,157

(22) Filed: Apr. 4, 2024

(65) Prior Publication Data

US 2024/0359824 A1 Oct. 31, 2024

(30) Foreign Application Priority Data

Apr. 27, 2023 (VN) .............................. 1-2023-02840

(51) Int. Cl.
*B64F 1/06* (2006.01)

(52) U.S. Cl.
CPC ..................................... *B64F 1/06* (2013.01)

(58) Field of Classification Search
CPC ................ B64F 1/06; B64D 7/08; B64D 1/06
See application file for complete search history.

(56) References Cited

U.S. PATENT DOCUMENTS

| | | | | | |
|---|---|---|---|---|---|
| 3,111,355 | A * | 11/1963 | Samburoff | H01R 13/631 | 439/296 |
| 3,119,645 | A * | 1/1964 | Abbott | H01R 13/453 | 439/155 |
| 3,224,335 | A * | 12/1965 | Witherspoon | F41F 3/055 | 439/153 |
| 3,780,617 | A * | 12/1973 | Tabarie | F41F 3/055 | 83/199 |
| 4,092,898 | A * | 6/1978 | Witherspoon | F41F 3/055 | 89/1.811 |
| 2014/0242831 | A1* | 8/2014 | Strahl | H01R 13/2442 | 439/626 |

FOREIGN PATENT DOCUMENTS

EP 2392889 A2 * 12/2011 .............. F41F 3/055

* cited by examiner

*Primary Examiner* — Travis S Chambers
(74) *Attorney, Agent, or Firm* — patenttm.us

(57) ABSTRACT

An automatic umbilical connector separating mechanism is separable in the same direction as the motion of a flying object. After the two connectors are connected, they are securely held in place by trigger mechanisms to prevent self-loosening and signal loss. When the flying object is launched and slides on the launch rail, the connector frame moves forward, releasing the trigger mechanisms. With tension from the chains and the force from the spring, the male connector frame pulls the male connector in the opposite direction. As a result, the automatic umbilical connector separating mechanism moves in the same direction as the flying object on the pins and guide holes of the connector frames. After the guide pins reach the end of their travel, the spring pulls the male connector frame up the launch pad, while the spring-loaded hinge folds the female connector frame into the flying object body.

10 Claims, 6 Drawing Sheets

AUTOMATIC UMBILICAL CONNECTOR SEPARATING MECHANISM ALLOWING SEPARATING IN THE SAME DIRECTION AS THE MOTION OF A FLYING OBJECT

TECHNICAL FIELDS

The invention concerns an automatic umbilical connector separating mechanism that is separable in the same direction as the motion of a flying object to establish and terminate electrical and communication connections between the flying object and the launch pad.

BACKGROUND OF THE INVENTION

As known, flying objects are electrically and communicatively connected to the launch pad through an umbilical connector consisting of a male connector arranged on the launch pad's structure and a female connector arranged on the flying object. When the flying object is launched, the male connector will detach from the female connector thanks to the umbilical connector separating mechanism to terminate the electrical and communication connections between the flying object and the launch pad.

The Russian patent RU02247919 C1, published on Mar. 10, 2005, discloses an umbilical connector separating mechanism used for flying objects. As depicted in FIG. 7A and FIG. 7B, this umbilical connector separating mechanism comprises a male connector (4) on the launch tube (1) connected to a female connector (5) on the flying object (2) perpendicular to the longitudinal axis of the flying object (2). The male connector detachment component (4) is installed in the recess (6) of the launch tube (1) and consists of two torsion springs (7, 8) mounted on the shaft (9). Each torsion spring (7 or 8) has a short end (10) connected to the launch tube (1) and the remaining end (11) shaped like an L with a shoulder (12) wrapping around the male connector (4). When the male connector (4) is connected to the female connector (5), the ends (11) are perpendicular to the longitudinal axis of the flying device (2) and create a torsional moment on the male connector (4). When the flying object (2) is launched, due to the pulling force of the female connector (5) and the elastic force of the torsion springs (7, 8), the male connector (4) is detached from the female connector (5) and retracts into the recess (6).

However, the umbilical connector separating mechanism disclosed in this patent still has a drawback. Since the male connector (4) connects to the female connector (5) perpendicular to the direction of motion of the flying object, the thrust force of the flying object (2) directly affects the pins of the male connector (4). Therefore, during the detachment process, there is often a phenomenon where the pins on the male connector are bent, leading to potential short circuits. In some cases, the pins of the male connector may fail to detach from the female connector, resulting in the breakage of electrical cables.

The Russian patent RU0002784626 C1, published on Nov. 29, 2022, discloses an umbilical connector separating mechanism used for flying objects as shown in FIG. 8. This umbilical connector separating mechanism comprises a male connector (4) on the launch pad (1) arranged to connect with a female connector (3) on the flying object (2) at an oblique angle of about 45 degrees with respect to the longitudinal axis of the flying object. In this mechanism, the male connector (4) is connected to a bracket (7) within the recess (9) of the launch pad using a resilient component (6). When the flying object (2) is launched, the male connector (4) will detach from the female connector (3) at the oblique angle, relying on the elastic force of the resilient component (6) and retract into the recess (9). Because the male connector (4) and the female connector (3) are connected at an oblique angle to the longitudinal axis of the flying device and due to the resilient component (6) being able to stretch and change its curvature radius, the interaction force of the electrical contacts of the male connector (4) and the female connector (3) is significantly reduced when they are detached during the separation of the flying device (2) from the launch pad (1). As a result, this helps to limit the bending of the pins of the male connector (4).

This umbilical connector separating mechanism still carries the risk of bending the pins of the male connector (4) because the retracting direction of the connector is inclined with respect to the motion direction of the flying object (2). Additionally, there is a drawback in the arrangement of the female connector at an oblique angle to the longitudinal axis of the flying object, which occupies a relatively large space within the fuselage, affecting the arrangement of other modules in the system.

Therefore, there is a need for an automatic umbilical connector separating mechanism for flying objects that effectively addresses the drawbacks of the retracting connector mechanisms mentioned above.

SUMMARY OF THE INVENTION

The purpose of the invention is to propose an automatic umbilical connector separating mechanism in the same direction as the motion of a flying object, effectively overcoming the drawbacks of the known umbilical connector separating mechanism mentioned above.

Another purpose of the invention is to propose an automatic umbilical connector separating mechanism in the same direction as the motion of a flying object, featuring securely clamping components to firmly hold the male and female connectors together after they are connected during the pre-launch device check process.

In order to achieve one or more of the purposes outlined above, the automatic umbilical connector separating mechanism in the same direction as the motion of a flying object is structured as follows:

A male connector (201) is securely attached to a male connector frame (204) via six countersunk hexagon screws (205), forming a male connector assembly (200).

The male connector assembly (200) is suspended from the launch pad (20) by two chains (40, 40') to create a pulling force opposite to the motion direction of the flying object (10) and a tension spring (60) to retract the male connector assembly (200) onto the launch pad (20).

A female connector (101) is securely attached to a female connector frame (102) along with a cover (103), forming a female connector assembly (100). The cover (103) is milled with a profile matching the profile of the body of the flying object (10) so that after folding the female connector assembly (100) into the body, maximum aerodynamic efficiency is achieved.

The female connector assembly (100) is attached to the body of the flying object (10) by torsion spring hinges (50) that always tend to create a folding torque, folding the female connector assembly (100) into the body of the flying device (10).

Ideally, the pulling force from the spring (60) should generate a centripetal force F1 parallel to the centripetal force F2 caused by the torsional moment from the torsion spring hinges (50). This arrangement ensures that when the male connector (201) connects to the female connector (101), the pins of the connectors must be held parallel to the longitudinal axis of the object (10). Additionally, after disconnecting, the two connectors are separated in the direction of the flying object's motion (10).

The female connector frame (102) has two guide holes (104, 104') parallel to the pins of the female connector (101) to connect with two guide pins (202, 202') on the male connector frame (204).

In an alternative implementation, on the female connector frame (102), there are two triggers (105, 105') symmetrically installed on both sides of the frame (102). Thanks to the pulling force of springs (106, 106'), these triggers secure the female connector frame (102) to the male connector frame (204) by tightening the two smooth-bodied shoulder screws (203,203') to avoid loosening after connecting the male connector (201) to the female connector (101).

After the flying device (10) is launched, the thrust force from the object (10) counteracts the pulling force from the springs (106, 106') of the triggers (105, 105'), releasing the two frames (102) and (204), pushing the female connector assembly (100) forward. With the holding force of the chains (40, 40') and the pulling force of the spring (60), the male connector assembly (200) tends to move in the opposite direction. As a result, the two guide holes (104, 104') move along the two guide pins (202, 202') with a length greater than the length of the pins of the connectors, ensuring that when the male connector (200) is pulled out of the female connector (100), it does not deform the pins. Furthermore, with the centripetal forces F1 and F2 always kept parallel, the process of pulling the connectors becomes smooth and easy.

Ideally, the two guide pins (202, 202') comprise one pin with a circular cross-section and one pin with a rectangular cross-section to ensure no superposition during assembly.

In an alternative implementation, the automatically retracting umbilical connector mechanism can be positioned at an inclined angle $\alpha$ of up to 45 degrees with respect to the vertical plane containing the longitudinal axis of the flying object (10).

DETAILED DESCRIPTION

Figure 1:
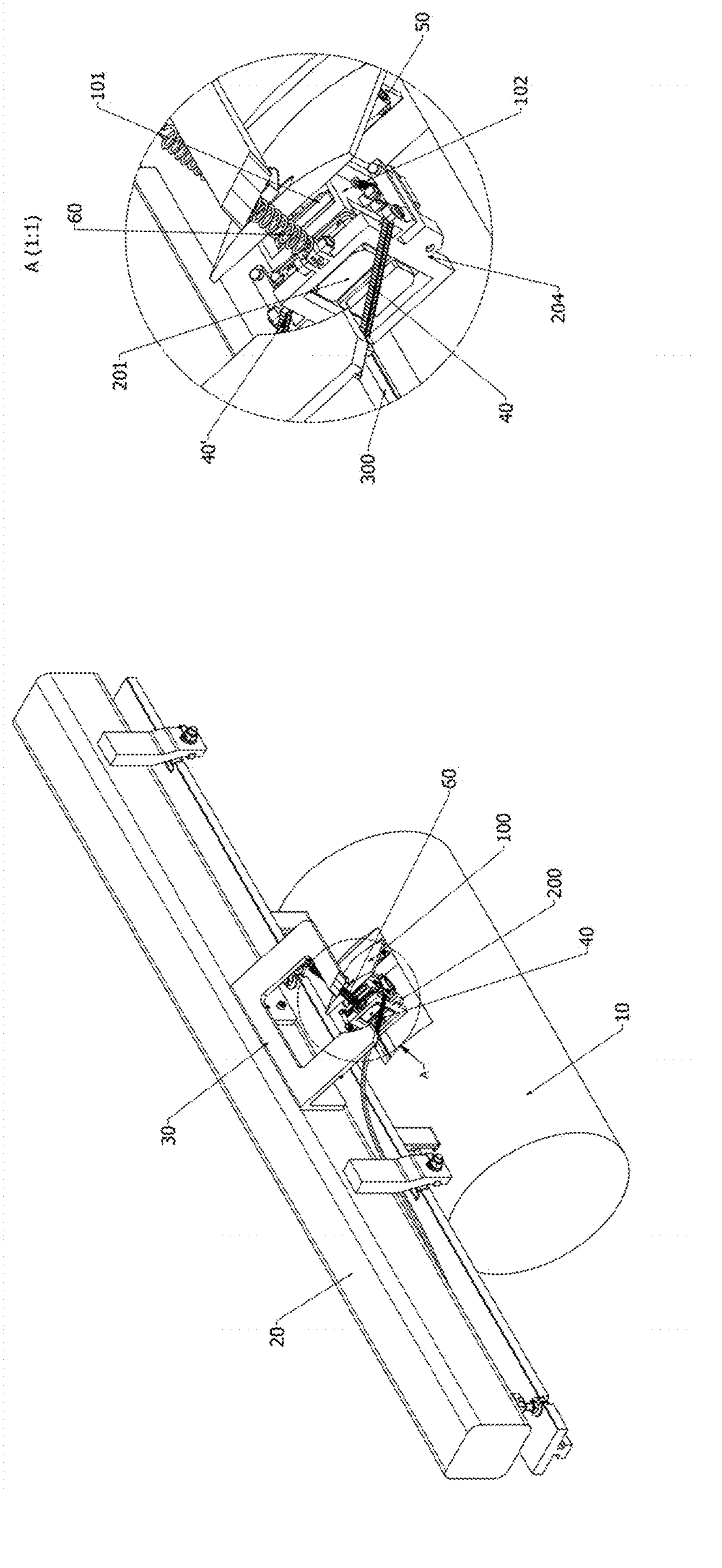
FIG. 1: An overall isometric view depicting the automatic umbilical connector separating mechanism in the same direction as the motion of the flying object.
Figure 2:
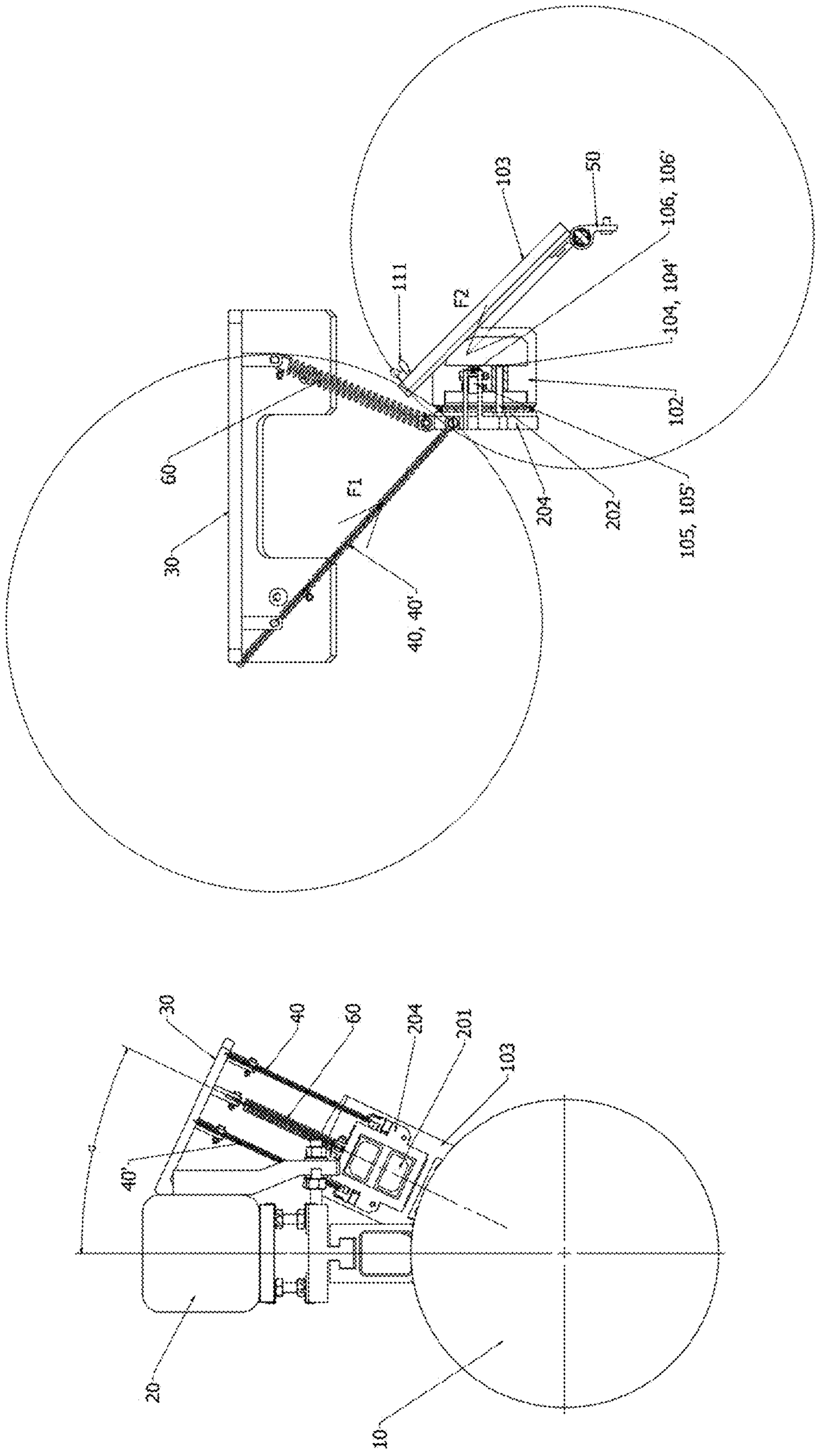
FIG. 2: Drawing depicting the assembly of the automatic umbilical connector separating mechanism and the angle of inclination relative to the vertical plane containing the longitudinal axis of the flying object.

Below, the advantages, effectiveness, and nature of the invention can be better understood through detailed descriptions of the preferred implementation options based on the accompanying drawings.

On the drawings, the same reference numbers are intended to represent identical or equivalent components or details and are used consistently throughout the description. Therefore, some drawings or certain parts of the drawings may not display one or more reference numbers to simplify and streamline the representation of the construction components or different operating principles of the invention. In such cases, the correlation between specific components or details with the reference numbers can be clearly illustrated when referring to other drawings or other parts of the drawing.

Persons skilled in the relevant technical field should understand that the embodiments described in the detailed description are merely illustrative to facilitate a better understanding of the nature and advantages of the invention, without limiting the scope of the invention to the described embodiments.

FIG. 1 depicts the flying object (10) mounted on the launch pad (20) with the automatic umbilical connector separating mechanism in the same direction as the motion of a flying object (10) to establish, terminate electrical and communication connections between the flying object (10) and the launch pad (20). As shown in FIG. 1, the automatic umbilical connector separating mechanism in the same direction as the motion of the flying object (10) comprises a female connector (101) arranged on the flying object (10) through a female connector frame (102) that can be folded into the body of the object (10), and a male connector (201) arranged on the launch pad (20) through a male connector frame (204) that can be retracted onto the launch pad (20). When the flying object (10) is launched, the female connector (101) moves in the same direction as the flying object (10) to separate from the male connector (201) and disconnect the electrical, communication connections between the flying object and the launch pad.

Figure 3:
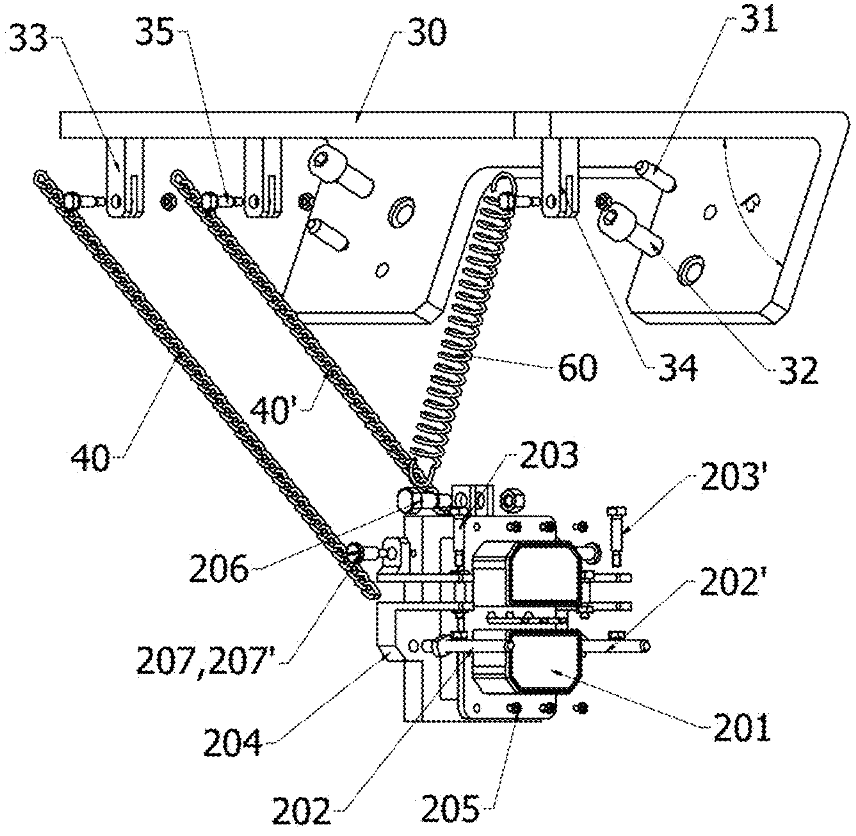
FIG. 3: Drawing describing the details of the automatic umbilical connector separating mechanism assembly on the launch pad.

As shown in FIG. 3, the support frame (30) is constructed from common aluminum and is angled at $\beta$ to accommodate the placement of the umbilical connectors. The frame (30) is mounted on the launch pad (20) using two positioning pins (31) and M8×20 screws (32). Tabs (33), (34) are welded onto the frame (30) in pre-drilled recesses to hang two chains (40, 40') and a tension spring (60) through smooth-bodied shoulder screws (35) to suspend the male connector frame (204).

As depicted in FIG. 3, the male connector (201) are fixed onto the male connector frame (204) using six M2×4 screws (205). Additionally, on the male connector frame (204), two guide pins (202) and (202') are installed, ideally positioned to align with guide holes (104, 104') for improved stability.

Figure 4:
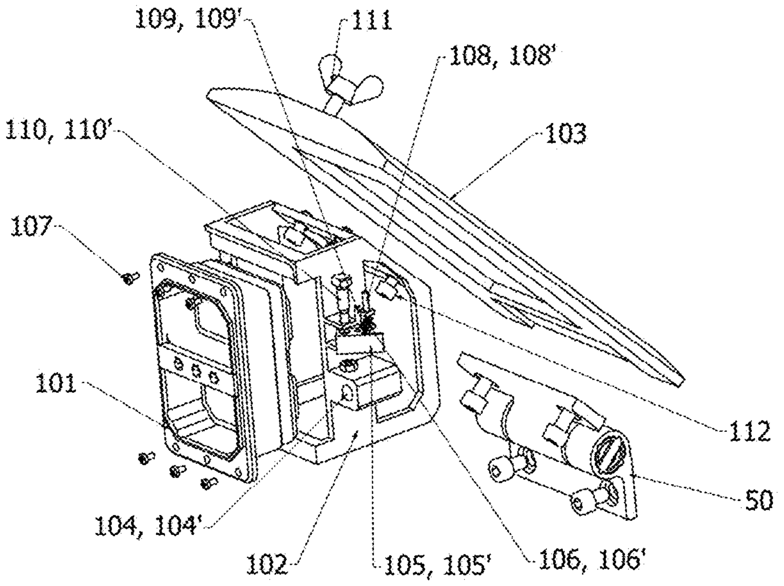
FIG. 4: Drawing describing the details of the automatic umbilical connector separating mechanism assembly on the flying object.
Figure 5:
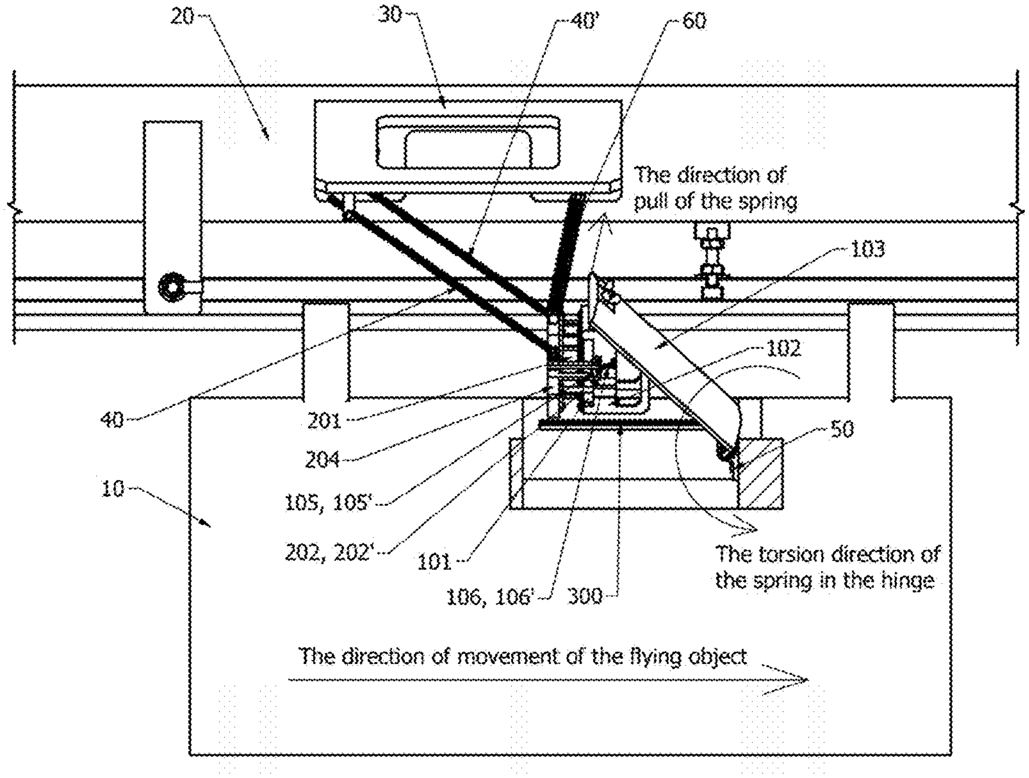
FIG. 5: Drawing depicting the movement state of the automatic umbilical connector separating mechanism assembly.

FIG. 4 illustrates the female connector (101) securely attached to the female connector frame (102) using M2×4 screws (107). On the frame (102), two trigger mechanisms are installed across the symmetrical plane of the frame (102). Each trigger mechanism consists of springs (106, 106') with one end attached to smooth pins (108, 108'), while the other end is attached to fixed pins (109, 109') on the triggers (105, 105'), which can rotate around the smooth-bodied shoulder screws (110, 110') on the female connector frame (102). Under the tension of the springs (106, 106'), the triggers (105, 105') function to secure the two disconnect connector frames (102) and (204) by tightening the smooth-bodied shoulder screws (203, 203') after connecting the two disconnect connectors, thus preventing unintentional loosening and signal loss in electrical and communication transmission.

Figure 6:
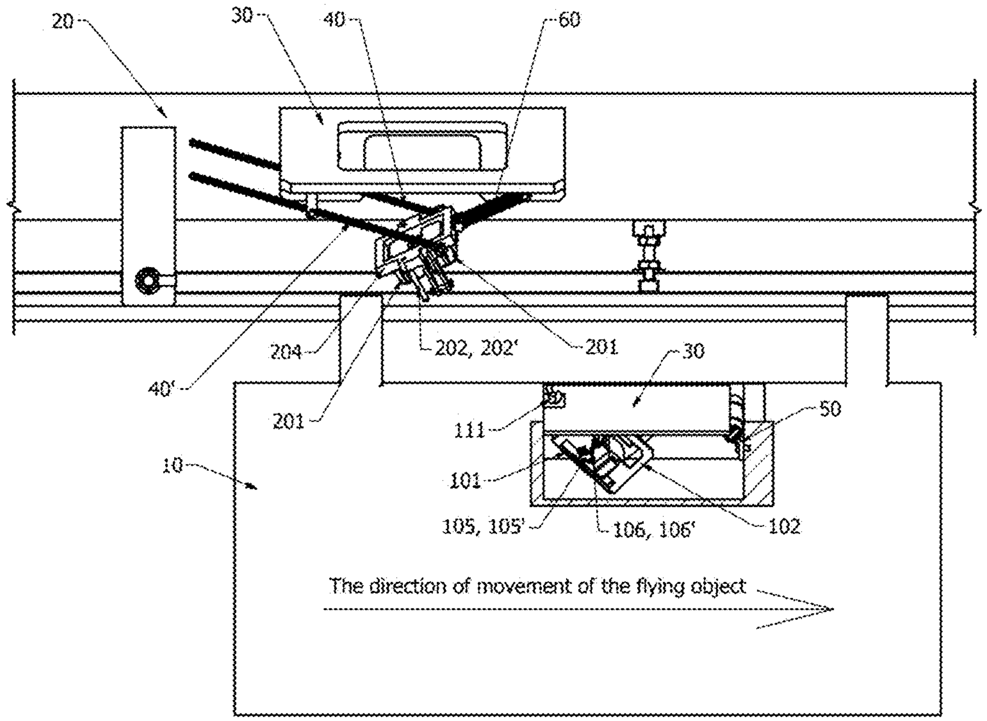
FIG. 6: Drawing depicting the state of retracting the umbilical connector assembly onto the launch pad and folding it into the body of the flying object.
Figure 7A:
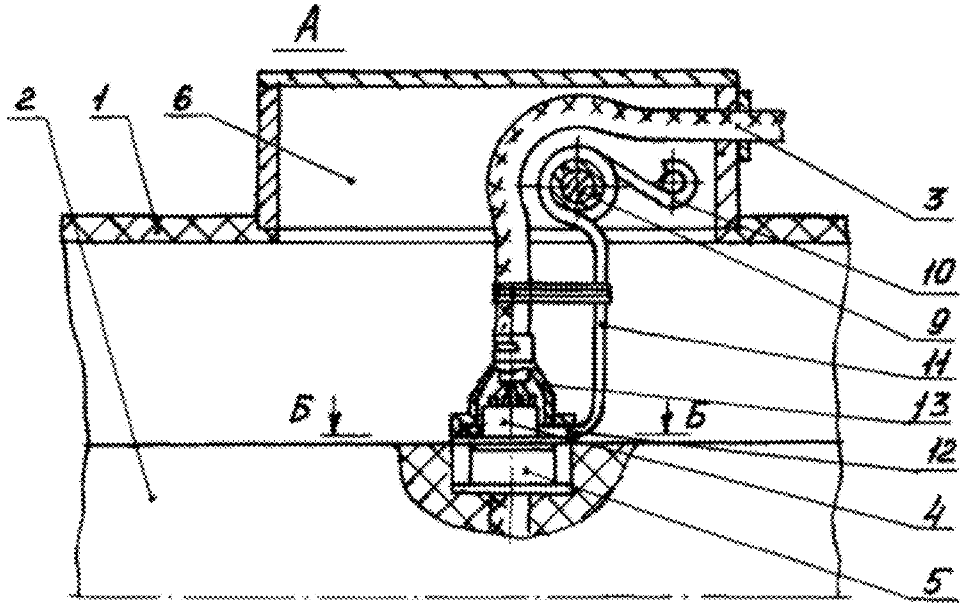
Fig.7A (PRIOR ART)
FIGS. 7*a* and 7*b*: Drawings depticting disclosure from prior art document RU02247919 C1.
Figure 7B:
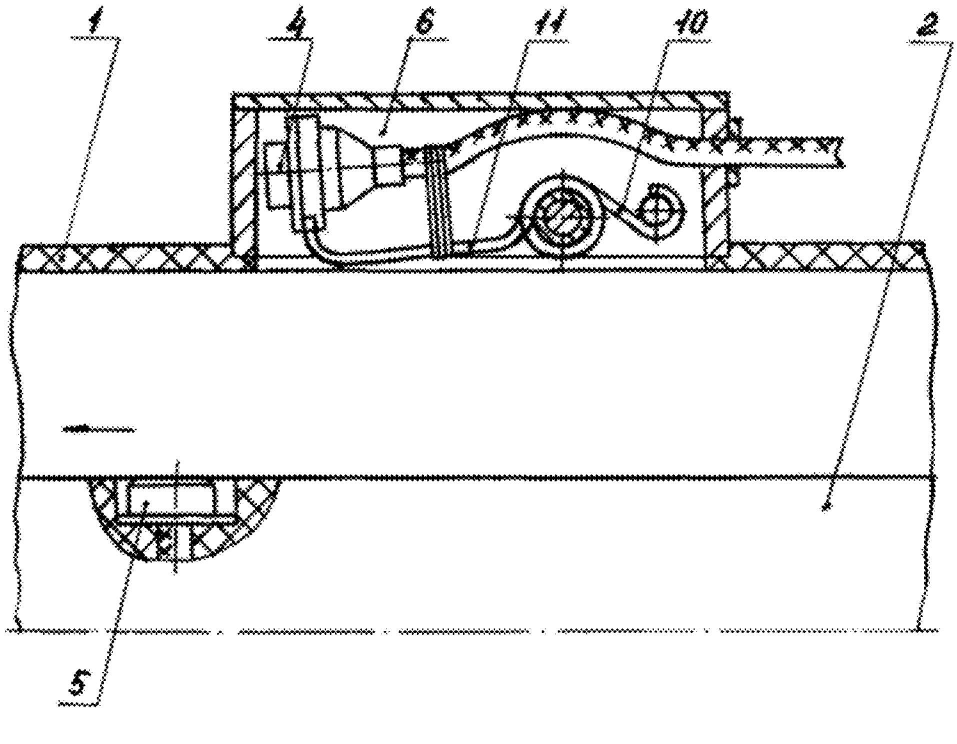
Fig.7B (PRIOR ART)
Figure 8:
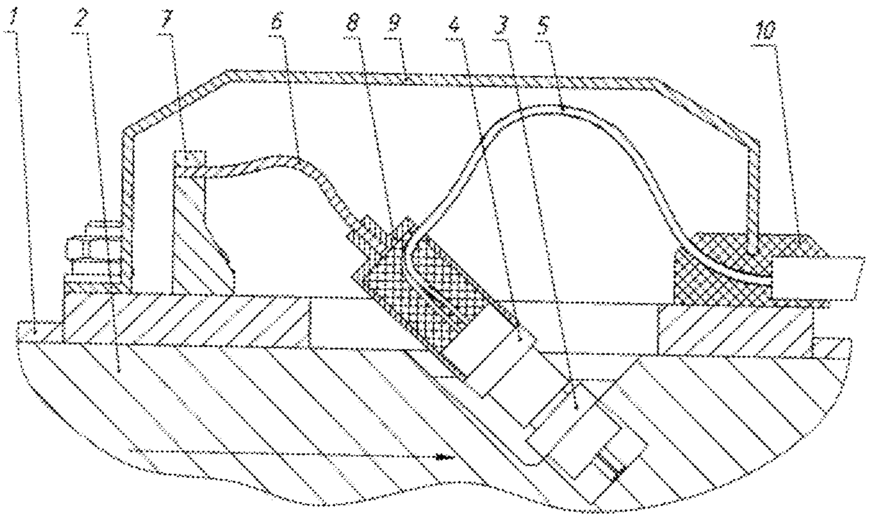
Fig.8 (PRIOR ART)
FIG. 8: Drawing depicting disclosure from prior art document RU0002784626 C1.

The female connector frame (102) is securely mounted onto the cover (103) using M4×8 screws (112) and connected to the body of the flying object (10) via a torsion spring hinge (50), which applies a twisting force tending to fold the entire frame (102) into the body of the object (10) as depicted in FIG. 6. Additionally, a threaded hole is tapped on the female connector frame (102) to install a wing screw (111), facilitating integration operations for added convenience.

The invention has been detailed through preferred embodiments, along with potential alternative or equivalent solutions, using appropriate descriptions and terminology so that individuals with average knowledge in the corresponding technical field can understand and implement the invention's solutions. Therefore, modifications, variations, or equivalent replacements based on the described content and approaches are considered within the scope of the invention, and the scope of protection of the invention is not limited by the described content and approaches but is determined in the claims below.

The invention claimed is:

1. The automatic umbilical connector separating mechanism allowing separating in the same direction as the motion of a flying object comprising:

a male connector is mounted on a male connector frame;

the male connector frame is fitted with two guide pins parallel to the pins of the male connector to connect with two guide holes on a female connector frame attached to the flying object;

the male connector frame is suspended on a launch pad by a support frame, with two chains to create a pulling force opposite to a movement direction of the flying object and one pull spring to retract the male connector frame and male connector onto the launch pad;

a female connector is attached to the female connector frame;

the female connector frame is fixedly mounted with a cover and attached to a body of the flying object by a torsion spring hinge, which tends to fold the entire female connector frame into the body of the flying object body;

the male and female connectors, after being connected, are fixedly held by two holding triggers;

when the flying object is launched, the thrust from the flying object pulls the female connector frame in a translational motion, resulting in the two guide holes on the female connector frame moving over the two guide pins;

meanwhile, the two chains and the pull spring pull the male connector frame in a opposite direction, resulting in the male and female connectors disconnecting and retracting, moving in the same direction as the flying object;

once the male connector is completely separated from the female connector frame, the pull force from the pull spring retracts the male connector and the male connector frame onto the launch pad to avoid collision with parts on the flying object body;

meanwhile, a torsion moment from the torsion spring hinge folds the female connector and the female connector frame into the object body to ensure aerodynamic quality after launch.

2. The automatic umbilical connector separating mechanism according to claim 1, where the two guide pins consist of one pin with a circular cross-section and one pin with a rectangular cross-section to ensure non-superposition during assembly.

3. The automatic umbilical connector separating mechanism according to claim 1, wherein positions of suspension loops for the two chains and a spring on the support frame, as well as an opening angle of the torsion spring hinge, are predetermined so that the pulling force from the pull spring and the two chains result in a centripetal force F1 parallel to a centripetal force F2 caused by the torsional moment from the torsion spring hinge, this ensures that when connecting the male connector to the female connector, the connector pins are held parallel to a vertical axis of the flying object, and after disconnecting, the male and female connectors are separated along a motion axis of the object.

4. The automatic umbilical connector separating mechanism according to claim 1 wherein the mechanism can be positioned at an inclined angle a of up to 45 degrees relative to the vertical plane containing the vertical axis of the flying object.

5. The automatic umbilical connector separating mechanism according to claim 1, further comprising a rubber cushioning pad to absorb impacts between the female connector frame and the body of the flying object caused by the torsional force of a spring in the torsion spring hinge.

6. The automatic umbilical connector separating mechanism according to claim 1 further comprising a wing screw screwed into a threaded hole on the female connector frame to facilitate integration tasks.

7. The automatic umbilical connector separating mechanism according to claim 1 further comprising a trigger mechanism with two triggers, the triggers each having one end freely rotatable around smooth-bodied shoulder screws mounted on the female connector frame, and one end attached to a first end of pull springs through pins;

a second end of the pull springs is attached to pins on the female connector frame, creating a tendency to pull and fold the triggers into the female connector frame and tighten it to two smooth-bodied shoulder screws on the male connector frame to fix the female umbilical connectors and male umbilical connector, thereby avoiding the misconception of self-loosening leading to loss of electrical and communication.

8. The automatic umbilical connector separating mechanism according to claims 1, including two symmetrical trigger mechanisms on both sides of the female connector frame to ensure secure fixation of the connectors during a connection process.

9. The automatic umbilical connector separating mechanism according to claim 1 utilizing smooth-bodied shoulder screws to secure the two chains, the pull spring onto the support frame, and the male connector frame to ensure flexible movement of the male connector frame when pulled up.

10. The automatic umbilical connector separating mechanism according to claim 1, wherein the cover is milled with a profile matching a cylindrical shape of the body of the flying object, so that when the female connector assembly is folded into the body, maximum aerodynamic efficiency is achieved.

* * * * *